US012265957B2

(12) United States Patent
Marshall et al.

(10) Patent No.: US 12,265,957 B2
(45) Date of Patent: Apr. 1, 2025

(54) METHODS AND SYSTEMS FOR PRE-VALIDATING TOKEN-BASED ACCESS CONTROL

(71) Applicant: Shopify Inc., Ottawa (CA)

(72) Inventors: Brent Marshall, Kitchener (CA); Nicole Sandford, Kitchener (CA)

(73) Assignee: Shopify Inc., Ottawa (CA)

( * ) Notice: Subject to any disclaimer, the term of this patent is extended or adjusted under 35 U.S.C. 154(b) by 123 days.

(21) Appl. No.: 17/893,370

(22) Filed: Aug. 23, 2022

(65) Prior Publication Data

US 2024/0013199 A1 Jan. 11, 2024

Related U.S. Application Data

(60) Provisional application No. 63/358,571, filed on Jul. 6, 2022.

(51) Int. Cl.
*G06Q 20/00* (2012.01)
*G06Q 20/32* (2012.01)
(Continued)

(52) U.S. Cl.
CPC ....... *G06Q 20/367* (2013.01); *G06Q 20/3278* (2013.01); *G06Q 20/38215* (2013.01); *G06Q 20/3825* (2013.01); *H04L 9/50* (2022.05)

(58) Field of Classification Search
None
See application file for complete search history.

(56) References Cited

U.S. PATENT DOCUMENTS 6,401,118 B1 6/2002 Thomas
10,505,726 B1 12/2019 Andon et al.
(Continued)

FOREIGN PATENT DOCUMENTS

CN 110111102 8/2019
CN 110490752 11/2019
(Continued)

OTHER PUBLICATIONS

Cruz-Piris; Methodology for massive configuration of OAuth 2.0 tokens; IEEE; pp. 5-12; 2020.*
(Continued)

*Primary Examiner* — Radu Andrei
(74) *Attorney, Agent, or Firm* — Rowand LLP

(57) ABSTRACT

Methods and systems for blockchain token-based access control in which an access control rule sets an access condition that is satisfied if a wallet address holds one or more specified non-fungible tokens or tokens having specified attributes. To conduct in-person or on-location token-based gating, the system may employ pre-authentication of a wallet address. An identifier may be stored securely on both the system and a user device following pre-authentication. When seeking access, a user device provides identification data generated based on the identifier and the system verifies that the identification data was generated based on the identifier and, on that basis, retrieves a pre-authenticated wallet address. It then verifies using blockchain data that the wallet address holds the requisite token or tokens to satisfy the access condition.

20 Claims, 7 Drawing Sheets

(51) Int. Cl.
    *G06Q 20/36*   (2012.01)
    *G06Q 20/38*   (2012.01)
    *H04L 9/00*    (2022.01)

(56) References Cited

U.S. PATENT DOCUMENTS

| | | |
|---|---|---|
| 10,929,842 B1 | 2/2021 | Arvanaghi et al. |
| 11,062,284 B1 | 7/2021 | Cunningham et al. |
| 11,075,891 B1 | 7/2021 | Long |
| 11,276,014 B2 | 3/2022 | Augustine et al. |
| 11,295,363 B1 | 4/2022 | Kao et al. |
| 11,443,838 B1 | 9/2022 | Cordonnier |
| 11,455,694 B2 | 9/2022 | Dinunzio et al. |
| 11,657,428 B1 | 5/2023 | Ritchie |
| 2005/0208940 A1* | 9/2005 | Takase .............. H04L 67/30 455/435.1 |
| 2007/0174079 A1 | 7/2007 | Kraus |
| 2010/0131386 A1 | 5/2010 | Shiely et al. |
| 2010/0235218 A1 | 9/2010 | Erhart et al. |
| 2013/0246146 A1 | 9/2013 | Fischer et al. |
| 2014/0129422 A1* | 5/2014 | Zhou .............. G06Q 40/03 705/38 |
| 2014/0351953 A1 | 11/2014 | Bhatia |
| 2014/0358629 A1 | 12/2014 | Shivaswamy et al. |
| 2015/0186980 A1 | 7/2015 | Wood |
| 2015/0249872 A1 | 9/2015 | Lee et al. |
| 2015/0324840 A1 | 11/2015 | Ramnath Krishnan |
| 2015/0363673 A1 | 12/2015 | Ronca |
| 2015/0363858 A1 | 12/2015 | Kleinhandler et al. |
| 2016/0171486 A1* | 6/2016 | Wagner .............. G06Q 20/326 705/39 |
| 2016/0171534 A1 | 6/2016 | Linden |
| 2016/0210674 A1 | 7/2016 | Allen et al. |
| 2016/0292672 A1 | 10/2016 | Fay et al. |
| 2017/0011460 A1 | 1/2017 | Molinari et al. |
| 2017/0116693 A1 | 4/2017 | Rae |
| 2017/0140408 A1 | 5/2017 | Wuehler |
| 2017/0155515 A1 | 6/2017 | Androulaki et al. |
| 2017/0221029 A1 | 8/2017 | Lund et al. |
| 2017/0330174 A1 | 11/2017 | Demarinis |
| 2017/0357966 A1 | 12/2017 | Chandrasekhar et al. |
| 2018/0108036 A1 | 4/2018 | Laufenberg et al. |
| 2018/0150869 A1 | 5/2018 | Finnegan |
| 2019/0066065 A1 | 2/2019 | Wright et al. |
| 2019/0073666 A1 | 3/2019 | Ortiz et al. |
| 2019/0130439 A1 | 5/2019 | Handrigan et al. |
| 2019/0139136 A1 | 5/2019 | Molinari et al. |
| 2019/0164157 A1 | 5/2019 | Balaraman |
| 2019/0220836 A1 | 7/2019 | Caldwell |
| 2019/0220917 A1 | 7/2019 | Busjaeger |
| 2019/0266616 A1 | 8/2019 | Strutton |
| 2019/0294817 A1* | 9/2019 | Hennebert .......... H04L 9/0861 |
| 2019/0303892 A1 | 10/2019 | Yantis et al. |
| 2019/0311341 A1 | 10/2019 | Rice |
| 2020/0005284 A1 | 1/2020 | Mjayan |
| 2020/0112446 A1 | 4/2020 | Yoshihama |
| 2020/0134660 A1 | 4/2020 | Kadaster |
| 2020/0153607 A1 | 5/2020 | Shi et al. |
| 2020/0242105 A1 | 7/2020 | Rich et al. |
| 2020/0244752 A1 | 7/2020 | Trainor |
| 2020/0272767 A1* | 8/2020 | Dunjic .............. G06F 21/64 |
| 2020/0311724 A1* | 10/2020 | Dunjic ............ H04L 9/0819 |
| 2020/0364703 A1 | 11/2020 | Joveski |
| 2020/0379981 A1 | 12/2020 | Yoon |
| 2021/0014042 A1 | 1/2021 | Sivathanu |
| 2021/0027273 A1* | 1/2021 | Bhuptani .......... G06Q 20/0457 |
| 2021/0124616 A1 | 4/2021 | Verma |
| 2021/0241351 A1 | 8/2021 | Francis et al. |
| 2021/0243201 A1 | 8/2021 | Tandel |
| 2021/0256070 A1 | 8/2021 | Tran |
| 2021/0366586 A1 | 11/2021 | Ryan et al. |
| 2021/0383334 A1 | 12/2021 | Krasnyansky |
| 2021/0390531 A1 | 12/2021 | Voorhees |
| 2022/0035936 A1 | 2/2022 | Lin |
| 2022/0045869 A1* | 2/2022 | Skeete .............. G06Q 10/087 |
| 2022/0058633 A1 | 2/2022 | Yantis |
| 2022/0076279 A1 | 3/2022 | Renaud |
| 2022/0198418 A1 | 6/2022 | Kang |
| 2022/0210061 A1 | 6/2022 | Simu |
| 2022/0222364 A1 | 7/2022 | Roberts |
| 2022/0292490 A1 | 9/2022 | Collen |
| 2022/0318233 A1 | 10/2022 | Martinez |
| 2022/0351187 A1 | 11/2022 | Kim |
| 2022/0398340 A1 | 12/2022 | Jakobsson |
| 2023/0043095 A1 | 2/2023 | Miliam |
| 2023/0062776 A1 | 3/2023 | Vosseller |
| 2023/0073545 A1 | 3/2023 | Kurian |
| 2023/0079195 A1 | 3/2023 | Matheson |
| 2023/0086191 A1 | 3/2023 | Jakobsson |
| 2023/0195855 A1 | 6/2023 | Mavromatis |
| 2023/0206218 A1 | 6/2023 | Defour |
| 2023/0306412 A1 | 9/2023 | Gaur |
| 2023/0360007 A1* | 11/2023 | Krishnaswamy .... G06Q 20/389 |
| 2023/0360029 A1 | 11/2023 | Pranger |
| 2024/0020682 A1 | 1/2024 | Castagna |
| 2024/0037593 A1 | 2/2024 | Navon |
| 2024/0039722 A1 | 2/2024 | Deluca |
| 2024/0046074 A1 | 2/2024 | Lewis |

FOREIGN PATENT DOCUMENTS

| | | |
|---|---|---|
| CN | 108364173 | 1/2021 |
| CN | 109272380 | 1/2023 |
| EP | 3748914 | 12/2020 |
| EP | 4148643 A1 | 3/2023 |
| RU | 2018132715 A | 3/2020 |
| TW | 1674543 | 10/2019 |
| WO | 2013111142 A2 | 8/2013 |
| WO | 2016202952 | 12/2016 |
| WO | 2017197110 | 11/2017 |
| WO | 2020092900 | 5/2020 |
| WO | 2022204404 | 9/2022 |

OTHER PUBLICATIONS

Ethelbert; A Json Token-Based Authentication and Access Management; IEEE; pp. 47-53; 2017.*
Xingxiong Zhu et al.; "Application of Blockchain in Document Certification, Asset Trading and Payment Reconciliation"; Journal of Physics: Conference Series, vol. 1187, Issue 5.
European Search Report dated Oct. 10, 2022, EP Application No. 22169579.4.
Sep. 10, 2021, XP055966676, Retrieved from the Internet: URL: http://en.wikipedia.org/w/index.php?title=Non-fungible_token&oldid=3593775#Collectibles.
US Office Action dated Oct. 17, 2022, U.S. Appl. No. 17/344,251.
US Office Action dated Jul. 11, 2023, U.S. Appl. No. 17/475,240.
US Office Action dated Mar. 6, 2023, U.S. Appl. No. 17/479,650.
US Office Action dated Apr. 21, 2021, U.S. Appl. No. 16/782,561.
US Office Action dated Oct. 7, 2021, U.S. Appl. No. 16/782,561.
US Office Action dated Jan. 20, 2022, U.S. Appl. No. 16/782,561.
US Office Action dated Jul. 26, 2022, U.S. Appl. No. 16/782,561.
Office Action dated Nov. 25, 2022, U.S. Appl. No. 16/782,561.
Office Action dated Apr. 14, 2023, U.S. Appl. No. 16/782,561.
Dialog, Online Searcher, to Be or Not to Be Competitive Intelligence Tools, Aug. 2019.
US Office Action dated Jul. 27, 2021, U.S. Appl. No. 16/782,556.
US Office Action, U.S. Appl. No. 17/473,284, filed Sep. 21, 2023.
USPTO; Office Action relating to U.S. Appl. No. 17/955,631 dated Apr. 15, 2024.
Antonopoulos, Andreas; "Mastering Bitcoin Unlocking Digital Cryto-Currencies", O'Reilly Media, Inc., all pages (Year 2014).
G. Gan, E. Chen, Z. Zhou and Y. Zhu, "Token-Based Access Control," in IEEE Access, vol. 8, pp. 54189-54199, 2020, doi: 10.1109 /ACCESS.2020.2979746. (Year: 2020).
Rafati et al., "DeTi: A Decentralized Ticketing Management Platform," J Netw Syst Manage, 2022, 30(4):62. doi: 10.1007/s10922-022-09675-3. Epub Jul. 26, 2022. PMCID: PMC9315850. (Year: 2022).

(56) References Cited

OTHER PUBLICATIONS

Regner et al., "NFTs in Practice—Non-Fungible Tokens as Core Component of a Blockchain-based Event Ticketing Application." retrieved from https://www.researchgate.neUpublication/336057493_N FTs_in_Practice_-_Non-Fungible_Tokens_as_Core_Component_of_a_Blockchain-based_Event_Ticketing_Application (Year: 2019).
Feulner et al., "Exploring the use of self-sovereign identity for event ticketing systems," Electron Mark, 2022, 32 (3):1759-1777. doi: 10.1007/s12525-022-00573-9. Epub Jul. 30, 2022. PMID: 35965736; PMCID: PMC9361939. (Year: 2022).
US Office Action dated Sep. 20, 2024, U.S. Appl. No. 17/955,631.
US Office Action dated Sep. 25, 2024, U.S. Appl. No. 17/866,746.
US Office Action dated Sep. 29, 2024, U.S. Appl. No. 17/867,975.
US Office Action, U.S. Appl. No. 17/475,240 dated May 9, 2024.
PCT Supplementary International Search Report relating to Application No. PCT/CA2023/050452 dated Jul. 12, 2024.
US Office Action, U.S. Appl. No. 17/903,109, filed Jun. 3, 2024.

* cited by examiner

114

E-Commerce Platform

Q Search

JG John's Apparel
Jonny B. Good

⌂ Home
🛒 Orders
◇ Products
○ Customers
⬚ Reports
◇ Discounts
⊞ Apps

SALES CHANNELS ⊕
⊕ Online Store
☐ Mobile App
View all channels

Good afternoon, Jonny B..

Here's what's happening with your store today.

Today's total sales    Today's visits
$98.00              1

● Update your Platform Payments tax details
We require additional information to verify your identity.
[Update tax details]

● Advanced Cash on Delivery has been deactivated for your store
[See why]

All channels ⌄   Today ⌄

TOTAL SALES
$98.00

$125
$75
$25
        12am    8pm    4pm    11pm
                              Jun 1
                              2 orders TOTAL SALES BY CHANNEL    View dashboard Online Store              Jun 1
$0.00                     0 orders Mobile app
$0.00                     0 orders Shopify POS (126 York St.)
$0.00                     0 orders ⚙ Settings

FIG. 8

METHODS AND SYSTEMS FOR PRE-VALIDATING TOKEN-BASED ACCESS CONTROL

CROSS-REFERENCE TO RELATED APPLICATIONS

The present application claims priority to U.S. provisional patent application No. 63/358,571 filed Jul. 6, 2022, the contents of which are hereby incorporated by reference.

TECHNICAL FIELD

The present disclosure relates to computer-implemented access control systems and methods and, in particular, systems and methods for pre-validating a blockchain wallet in the context of token-based access control.

BACKGROUND

In many online access control systems, a rule set may determine the conditions under which access is granted or denied to a requesting device. For example, a rule may require that the requesting device provide authorized credentials prior to providing access to a resource. As another example, a rule may provide that a requesting device with a particular characteristic is blocked from accessing a resource, e.g. a certain device type, geographic location, operating system, or other features or characteristics of the requesting device. In some cases, access may be based on blockchain data associated with a blockchain wallet, such as tokens held by the wallet.

To determine whether to grant access, a computing system obtains at least a wallet address and a digital signature from a requesting device. The system verifies that the digital signature proves control or ownership of the wallet address and it then determines from blockchain data whether the verified wallet address meets the access condition specified in the access control rule, such as holding one or more non-fungible tokens of a specified class or type. In some instances, token-based access control may be used for in-person gating, such as to access a product, service, discount, etc., at a point-of-sale system, or to physically access a venue or event.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
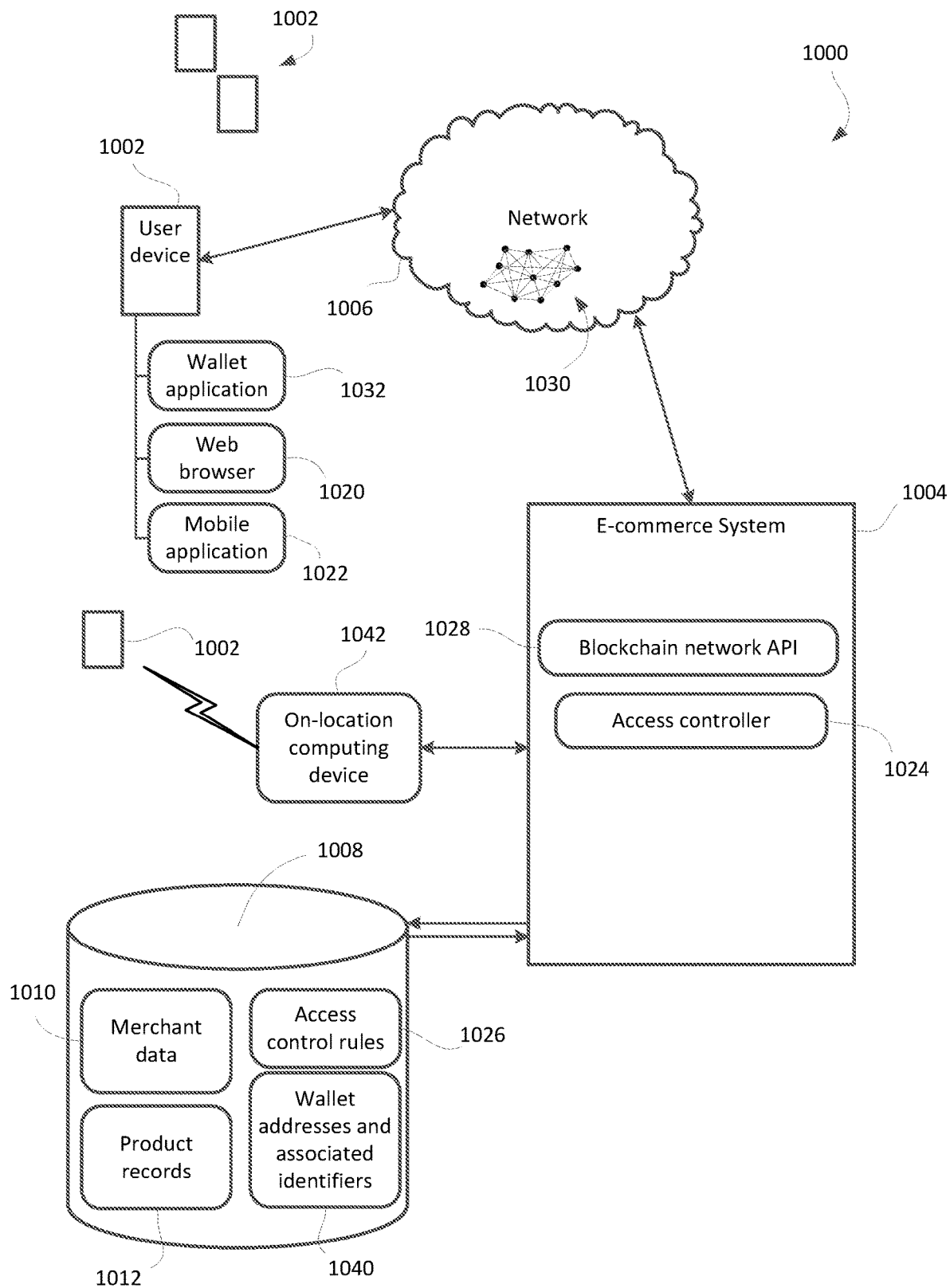
FIG. 1 is a simplified example system.

In one aspect, the present application discloses computer-implemented methods. The method may include receiving, at a computing system, a digital signature and a wallet address; and validating the digital signature and, based on validation, storing the wallet address in association with an identifier. The method may then further include receiving, from a user device, an access request including identification data, the identification data purporting to be based on the identifier; confirming that the identification data is based on the identifier; responsive to confirming that the identification data is based on the identifier, retrieving the wallet address associated with the identifier; determining, based on blockchain data from a blockchain network, that the wallet address is associated with one or more tokens and that the one or more tokens satisfy an access condition associated with the access request; and responsive to determining that the wallet address is associated with the one or more tokens and that the one or more tokens satisfy the access condition associated with the access request, performing an action.

In some implementations, the access request is received from the user device via a short-range communication module in a computing device coupled to the computing system. In some cases, performing an action includes outputting a success signal at the computing device coupled to the computing system. The success signal may be an audio-visual signal.

In some examples, the short range communication module includes a scanning device and the identification data includes a hash of the identifier. In some cases, the scanning device includes an optical scanning device configured to obtain a QR code displayed on the user device, and the QR code encodes the identification data.

In some implementations, the identification data may be generated by the user device using the identifier and a nonce, and confirming may include independently generating the nonce; hashing the nonce together with the identifier stored in association with the wallet address to obtain a hash result; and confirming that the hash result matches the identification data received. The nonce may be time-based.

In some implementations, storing includes storing the wallet address and the identifier in association with a user identifier, wherein receiving the access request further includes receiving the user identifier, and wherein confirming further includes retrieving the identifier from memory based on the user identifier. The user identifier may include a device identifier or a user account identifier for a user account on the computing system. In some cases, the computing system is an e-commerce system, the user identifier is the user account identifier for the user account on the e-commerce system, and the user account identifier is associated with an e-commerce application on the user device.

In some implementations, receiving the access request includes receiving the access request from the user device by an on-location computing device coupled to the computing system, wherein the on-location computing device includes an image sensor and receiving includes detecting a machine-readable code displayed on a display screen of the user device. In some examples, the on-location computing device is one of an automated turnstile, a handheld scanning device, a smartphone, a tablet, or a point-of-sale device.

In some implementations, the access request includes a request to obtain a limited access item or a request to enter a limited access event.

In another aspect, the present application discloses a computing system including one or more processing units, one or more data storage units, and memory storing processor-executable instructions that, when executed by the one or more processing units, are to cause the processing units to carry out the operations of one or more of the methods described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . ." is intended to cover any one or more of the listed elements, including any one of the listed elements alone, any sub-combination, or all of the elements, without necessarily excluding any additional elements, and without necessarily requiring all of the elements.

In the present application, the terms "e-commerce platform" or "e-commerce system" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

Some of the examples below refer to a "product record". A product record in this context may refer to data regarding a specific product item, or a specific version of that product item. The data may include details of the product item, technical specifications, narrative description, image(s) of the product item, customer reviews, pricing information, inventory information, shipping information, or any other product data of a similar nature. In some cases a product record may be a web page. In some cases, the product record may be an XML record. The product record may be embodied in any other suitable mark-up language or other coding language.

The growth of blockchain networks has led to the development of non-fungible tokens (NFTs). Each NFT is a unique combination of characteristics/attributes and/or media. Each NFT also has a unique token ID.

In many implementations, a smart contract may be created for the purpose of minting and/or tracking NFTs. The Ethereum blockchain network has an associated standard, ERC-721, providing a reference implementation of a smart contract for tracking and managing NFTs. Various other standards, such as ERC-1155 for fungible and non-fungible tokens and/or ERC-20 for fungible tokens, may apply. In some cases, the NFTs generated by a smart contract may form a collection, in that the NFTs generated by that smart contract have some limited universe of possible attributes or characteristics. In some cases, the NFTs in a collection are computer-generated art in which various layers of digital art are made available for pseudo-randomized selection to generate each unique digital media. The layers may correspond to particular characteristics, such as various eyes, mouths, hats, accessories, etc., used to generate a unique digital image. In some other cases, the NFTs in a collection may be images or videos that relate to a particular type of activity, sport, or other interest, such as images or videos of particular football players, video clips from baseball plays, photographs of a specific celebrity or group of celebrities, etc. Example NFT collections include, for example, the "Bored Ape" collection, the "NBA™ TopShot" collection, or the "Invisible Friends" collection.

A smart contract is executable computer code recorded on the blockchain that, when properly "called" in a subsequent blockchain transaction, executes so as to carry out its defined operations. In the case of an NFT smart contract, a minting operation may cause the smart contract to produce a new unique NFT that corresponds to a particular one unique NFT. That unique NFT may be digital art, an image, a video, or a combination thereof in some examples. Each NFT may have associated attributes or characteristics. Example attributes include the elements pseudo-randomly selected for generation of the digital image, such as specific eyes, mouth, accessories, etc., for an image of a character. Another set of example attributes may be the context or characteristics of a particular image or video, such as the identity of the person/player featured, the team or teams involved, the date, the score, the type of play, or other such features.

Once NFTs are minted, they may be made available through an online marketplace in some cases. Various wallets, i.e. network-connected computing devices with blockchain wallet software operating thereon, may initiate blockchain transactions to obtain and/or transfer NFTs. Ownership of an NFT by a wallet is recorded on-chain and is verifiable by third parties. In some cases, a wallet may own a plurality of NFTs. The ownership of those NFTs may be verifiable by third parties based on a query to the blockchain network, i.e. to a blockchain node, providing data from the wallet, such as a wallet address and/or a public key associated with the wallet. In some cases the query may identify the NFTs by way of unique identifiers, or by way of an identifier for the NFT collection to which they belong. The blockchain node may respond by providing verification that the public key provided is associated with the NFT as reflected in the data recorded on the blockchain. The NFT smart contract may provide functions for verifying NFT ownership data.

While many NFTs have been generated to represent ownership interest in some auto-generated digital media, in other cases NFTs may be used as a "proof-of-purchase" or a receipt or record of ownership or investment. In this context, NFTs may indicate a history of purchases or certain product items and, in some cases, record current ownership of those product items. An NFT may be as simple as a record of purchase (receipt) for various common items from a grocery store. In some cases, the NFT may be a record of ownership of a non-perishable real-world item, such as real estate, a financial instrument, an automobile, etc.

In yet other examples, NFTs may be used as a "ticket" for access or as a "proof-of-attendance". For instance, a concert ticket may be minted and recorded as an NFT, which when validated at a venue (e.g. using a QR code scanner or the like to obtain a wallet identifier and an NFT identifier and then validate ownership via a blockchain query) grants the holder of the user device access to the concert. As another example, an NFT may record the fact of attendance at an event, such as a training course or a social event. NFTs may signal membership in a club, attendance at a restaurant, participation or level or progress in an online game, or any other such events.

Access control systems may rely on pre-generated rule sets that specify conditions for granting or denying access to a resource. An administrator of such a system must usually determine the applicable condition or combination of conditions in advance and embody them in suitable access control rules. The system then, in response to a request for access from a requesting device, retrieves the access control rules and assesses whether the requesting device and/or its present context meets the condition or combination of conditions specified in one of the access control rules. Access to the resource is then granted or denied based on that assessment. In this manner, the system gates access to the resource based on the condition or combination of conditions.

In some situations, access control rules may be set that include conditions relating to token holdings. That is, an access control rule may limit access to the online resource to user devices that have a blockchain wallet associated with ownership of one or more tokens or types of tokens. The tokens may be fungible or non-fungible. The condition may indicate that the token or tokens be from one or more specific collections or categories of tokens. The condition may indicate that the token from a certain collection is to have one or more particular attributes or features. There are a range of token-based access conditions that may be set.

In some examples, the restricted online resource may be a webpage, server login, computer game, livestream, or other such online resource to which access may be controlled. In an illustrative example, the online resource may be an e-commerce product or service. That is, access to one or more products or services available via an e-commerce system or platform may be controlled based on ownership of one or more tokens (e.g. NFTs) having certain characteristics or attributes. In some cases, the access is to a version of a webpage or other online resource associated with the product or service that includes a discount or incentive not otherwise available for that product or service. The online resource may be accessed by a computing device via a webpage or mobile app interface, wherein a remote server, e.g. an e-commerce platform, determines that access by the computing device is permitted based on verification that one or more NFTs meeting the access conditions are associated with the computing device. In some cases, the restricted resource is access to a venue or event, wherein the NFT serves as a ticket permitting the holder to access the venue or event once ownership of the NFT is validated at a point-of-access. In another example, the NFT may serve as a coupon or the like, such that when ownership of the NFT is proven at a point-of-sale location the holder of the NFT is entitled to a free or discounted item.

To prove ownership of one or more tokens, a user connecting to a system through a user device causes the user device to provide wallet information to the system. This may employ certain WalletConnect protocols, in some cases. The system may challenge the user device using a message, and the user device may provide the system with a wallet address and a digital signature over the message that evidences possession by the user device of the private key that corresponds to a public key associated with the wallet address. The system may cryptographically verify that the digital signature corresponds to the wallet address, thereby authenticating the wallet address as being owned by the user of the user device. The system may then obtain data from a blockchain network regarding the wallet address, for example, ownership data detailing the fungible or non-fungible tokens held by that wallet address. In this manner, the system is able to determine that the user device is associated with the wallet address, validate using the blockchain which tokens the wallet address holds, and determine whether those tokens satisfy the access condition.

One technical challenge is that the above-described process may involve multiple communications between the user device and the computer system and one or more external services providing blockchain data. In the context of a point-of-sale or physical access control location, this may be excessively slow and may result in long slow moving lines. As an example, when dealing with a high volume event, such as a flash product give-away that is based on NFT ownership, or gating access to a concert or sports event, the speed at which NFT ownership is validated is important to ensure speedy throughput. At the same time, the system must be able to guard against unauthorized access. Early pre-clearance of a user device based on the contents of a wallet address at an earlier time may result in later granting access to the holder of that user device at a time when the wallet address no longer holds the requisite NFT(s). Depending on design, this could also possibly lead to double-use of the same NFT(s) by different persons to access the same product or event.

Accordingly, in some aspects, the present application provides for methods and systems for pre-validating token-based access to improve throughput and speed of on-location gating, but using processes that do not compromise security of access.

In order to conduct on-location gating in connection with blockchain token-based access control, the computing system includes an on-location computing device to which it is coupled and which is configured for communication with a user device presented at the location. The on-location computing device may include a short-range communication module in some cases for receiving short range communications from the user device. In some examples, the short-range communication module may include inductive coupling, such as near-field communications (NFC), electromagnetic communications such as WiFi Direct™ or Bluetooth™, or other such short-range communications protocols. In some cases, the short-range communication module may include an imaging device, such as a camera or other such scanning device, to capture image data displayed by the user device. For example, the computing device may include a camera configured to capture a QR code (or the like) displayed by the user device and which encodes data for transmission to the computing device.

In order to conduct a challenge and receive a response to the challenge, such as a digital signature, the computing device may need to transmit data, such as a challenge message, to the user device. This may occur over a short-range or long-range communication channel in some cases. However, in some examples of the present application, the authentication of the wallet address as being associated with the user device occurs prior to the on-location access control point. The pre-authentication of the wallet address may occur over a long-distance communication channel, such as WLAN, WAN, etc. During the pre-authentication stage, the user device may engage in a wallet connect operation with the computing system. Such a wallet connect operation may include receiving a challenge message at the user device and providing a digital signature to the computing system over the challenge message. The computing system may then verify that the digital signature validates ownership of the wallet address. In order to enable later reference to the pre-authentication operation, the computing system may provide the user device with an identifier, or the identifier may be sent to the computing system by the user device. In some cases, the computing system and user device independently determine the identifier using a deterministic protocol. The computing system stores the identifier in association with the wallet address. In some cases, the identifier is further stored in association with a user identifier, such as an account identifier or the like.

In this manner, when the user later interacts with an on-location computing device in order to request access, the user causes the user device to generate identification data from the identifier and to transmit or display the identification data to the on-location computing device as part of an access request. The on-location computing device and/or computing system receives the access request and, in particular, the identification data (for example through scanning of a QR code, or via an NFC transmission) and may verify that the identification data is based on an identifier that corresponds to a pre-authenticated wallet address stored in memory at the computing system. In this manner, it verifies that the presented user device corresponds to the pre-authenticated wallet address, without having to send a challenge message to the user device and without having to conduct cryptographic operations to authenticate the wallet address at the time of on-location gating. It may then conduct the second stage of access control by confirming from blockchain data that the pre-authenticated wallet address contains the requisite NFT(s) specified by the access condition. The result of the access control test may be determined by or communicated to the on-location computing device which may then perform an action in response to the access request. The action may include outputting a notification by the on-location computing device, such as a visual or audible alert indicating the result. The audible and/or visual alert may indicate access permitted or access denied depending on the test result. The on-location computing device may be a range of possible computing devices, including, as examples, a smart phone, a tablet, a handheld scanner, an access gate/turnstile, or a point-of-sale device.

It will further be appreciated that the pre-authentication of the wallet address in embodiments in which the short-range on-location communication is by way of QR code or NFC communications, may mean only a one-way communication is required, i.e. from user device to on-location computing device. The computing device does not need to send the user device a challenge message or otherwise establish a two-way communication channel. In some embodiments, it may simply scan a displayed QR code, bar code, or other machine-readable displayed data. This may simplify the communications complexity at the on-location gating thereby reducing delay and the possibility of failed communications or technical issues during access control.

The pre-authentication may, in some cases, occur using a device other than the user device. For example, a user may initiate a pre-authentication operation with the computing system using a web browser or application on a laptop or other personal computer. The pre-authentication operation may be initiated in association with a user identifier, such as an account identifier associated with the user and known to the computing system. When presenting the user device for on-location access control, the user device may be configured to provide identification data (for example via QR code) to the on-location computing device. The identification data is generated based on the identifier. In the case where the identifier is an account code or other user identifier known to the computing system, it may also be provided to or stored in the user device at an earlier time when the user device is logged into the computing system. In some cases, the user device may include a mobile application or the like that is linked to or associated with the computing system. The mobile application may receive and store the identifier from the computing system. The identifier may be stored in a secure location in memory on the user device, and may be used by the mobile application to generate the identification data that is provided to the on-location computing system, in some examples.

A security issue may arise in these circumstances in which a pre-authenticated wallet address is associated with an identifier and that identifier is stored on a user device. If the user device is configured to generate and output (e.g. display) identification data that corresponds to the identifier (e.g. a QR code), then that output may be copied and shared (intentionally or unintentionally) with other devices that may then use that output to gain unauthorized access or duplicate access. In some implementations, the identification data may be generated based on the identifier in a manner that includes a time-linked element or nonce so as to ensure a pre-generated QR code or other identification data output cannot be later used to gain access. That is, the identification data needs to be generated within a short time window at the time of gating access.

One mechanism for ensuring non-use of pre-generated identification data is to rely on an identification data generation algorithm that uses a static seed (e.g. the identifier) and a moving factor (e.g. a time step). Time steps may be based on network time, Unix time, or another time base that can be determined by both the on-location computing device and the user device. The time step may be in increments of 30 seconds, 60 seconds, or some other window. The identifier and time step may be input to a hash function to generate the identification data. The QR code or other output generated by the user device may include an account, user, wallet address, or other identification element that the computing system may be determined corresponds to a stored pairing of the wallet address and identifier. The QR code may further include the generated identification data, which may be a hash of the identifier and time step.

At the on-location computing device (or computing system if it is sent the scanned data by the computing device), the scanned identification data is verified by retrieving the identifier from memory (based on the identification element provided, such as the wallet address or other such data) and hashing it together with the current time step. If the result matches the identification data obtained from the user device, then the computing system has verified that the user device is in possession of the identifier and it may proceed to the second stage of access control by verifying that the wallet address holds the requisite NFT(s).

Reference will now be made to FIG. 1, which diagrammatically illustrates a simplified example system 1000 in accordance with an aspect of the present application. In this example, the system 1000 includes a network-connected server, which in this example is an e-commerce system 1004, and a plurality of user devices 1002. The user devices 1002 and e-commerce system 1004 may communicate over a network 1006. The network 1006 may include interconnected wired and/or wireless networks, including the Internet. The user devices 1002 may include a range of computing devices, such as laptops, desktops, tablets, smartphones, and the like.

The e-commerce system 1004 may be implemented using one or more servers. The e-commerce system 1004 may include data storage 1008, which may include one or more databases or other data structures within or accessible to the servers. The data storage 1008 may include merchant data 1010 regarding merchant accounts with the e-commerce system 1004, including merchant identifiers and settings and parameters for respective merchants. The data storage 1008 may further include product records 1012. In some cases, each merchant account has a set of associated product records 1012 reflecting the products or services offered via that merchant account. The product records 1012 may include details regarding one or more products, images, pricing, shipping information, technical parameters, textual description, reviews, or other data regarding the product. Product records 1012 may be grouped into classes and/or subclasses.

The user devices 1002 may include a web browser 1020 and/or a mobile application 1022 through which the user device 1002 is able to connect with the e-commerce system 1004 in order to browse a merchant's online store interface so as to view available products or services. The web pages or other resources served to the user devices 1002 via the web browser 1020 or mobile application 1022 may be generated or obtained from the stored product records 1012. As a user device 1002 searches or browses products from a particular merchant, the e-commerce system 1004 may retrieve the corresponding product records 1012 for causing display of the product data on the user device 1002. In some implementations, the merchant data 1010 may include settings or parameters that configure the UI and presentation served to the user devices 1002, thereby providing users with a merchant-specific storefront within which to browse and purchase items.

The e-commerce system 1004 includes an access controller 1024. The access controller 1024 may be implemented by way of suitable computer executable code for regulating access to some or all of the product records 1012 and other data within the e-commerce system 1004. In one example, the access controller 1024 may limit access to some or all of the features or options available by way of user authentication. That is, user's, such as customers or merchants, accessing the e-commerce system using a remote device must provide valid user credentials to be authenticated. Once authenticated, the user is granted the level of access corresponding to their user type or class. A merchant user may gain access to edit its product records 1012, store design, and some of its merchant data 1010. In some cases, a customer user need not provide any user credentials and is permitted to browse merchant stores or to make purchases in a "guest" mode. If credentials are provided, the user may be "logged in" to a user account that enables access to additional features or saved preferences, including purchase history, loyalty points, saved purchase credentials (e.g. credit card details), or other user-specific features.

In some cases, the access controller 1024 may be configured to validate tickets to events or venues, such as for concerts, sporting events, or the like. The tickets may have been purchased through the e-commerce system 1004. In some cases, the tickets or event have a corresponding "product" record 1012 which the user devices 1002 may view and based on which the user may purchase a ticket to gain access to the event.

In this example, the network 1006 further includes a blockchain network 1030. The blockchain network 1030 may operate in accordance with a blockchain protocol, such as Bitcoin or Ethereum, as examples. The user device 1002 may include a wallet application 1032, which is a blockchain application on the user device 1002 that may store blockchain-related data. In some cases, the wallet application 1032 may securely store public and private key pairs associated with the user device 1002. The public keys may be shared and made publicly available for the purpose of receiving blockchain-based data transfers of fungible or non-fungible tokens. The private keys may be stored securely and confidentially and may be used by the wallet application 1032 in certain signature operations for providing digital signatures that prove ownership of corresponding public keys, among other things. The public keys may represent or be mathematically linked to corresponding wallet addresses. The wallet address may be referenced in blockchain transactions as a sender or recipient of digital assets. A given wallet address may be recorded as the "owner" or holder of one or more digital assets, as reflected by the blockchain. The wallet application 1032 may be referred to as a simplified payment verification (SPV) client in some implementations.

The wallet application 1032, in this example, may include NFT data with regard to one or more NFTs associated with the user device 1002. The NFT data may include, in some cases, an NFT identifier, a public key associated with the wallet (e.g. a wallet identifier or address), a transaction identifier associated with ownership of the NFT, an NFT collection identifier, a smart contract identifier, or other such data regarding the NFT and/or its ownership by the user device 1002. In some cases, the NFT data may include additional data regarding the NFT itself, such as associated media (e.g. image or video), attributes, or a textual description.

In some implementations, the wallet application 1032 may be configured to provide data to the e-commerce system, such as wallet address information and/or NFT data. For example, the wallet application 1032 may use an open-source WalletConnect protocol or other such protocol to connect and interact with decentralized applications (dApps). In some cases, the connect protocol may be used to connect the wallet application 1032 to the mobile application 1022. In some cases the connect protocol may be used to connect the wallet application 1032 to the web browser 1020. In short, the wallet application 1032 is configured such that it is able to securely provide wallet address and/or NFT data to the e-commerce system regarding NFTs purportedly owned by the user of the user device 1002, and/or to authenticate the user device's 1002 possession of certain public keys associated with particular wallet addresses.

The access controller 1024 may be configured to control access to one or more of the product records 1012 based upon access control rules 1026. Each access control rule 1026 may specify one or more product records 1012, or a class of product records 1012, to which it applies. Each access control rule 1026 may be associated with a specified one of the merchant accounts. Each access control rule 1026 may further include a condition for obtaining access to the associated one or more product records 1012 or class of product records 1012. The condition, in these examples, includes ownership of one or more NFTs meeting token criteria such as a specified set of attributes.

The e-commerce system 1004 and, in particular, the access controller 1024, may be configured to verify that a user device meets an access condition within an access control rule 1026 at certain points during a user session. Specifically, the access controller 1024 may be triggered to verify an access condition is satisfied if a restricted access product record is requested during a first phase of a user session, such as during product browsing or product search. The access controller 1024 may further be triggered to verify the same access condition is satisfied if that restricted access product record is referenced when a request for checkout is received and/or a payment operation is initiated. In other words, the same access control rule 1026 applicable to a product record 1012 may be checked at multiple points during the user session, such as when the product record 1012 is first requested during browsing or search, when the product identifier for that product record 1012 is referenced in an add-to-cart request, when the product identifier or cart object containing that product identifier is referenced in a checkout request, or when the product identifier or cart object containing that product identifier is referenced in a payment request, as examples.

In the examples in this application, the system 1000 further includes an on-location computing device 1042 coupled to the e-commerce system 1004. The on-location computing device 1042 may be a point-of-sale device or kiosk, an automated turnstile, a smartphone, a tablet, or any other such computing device. The on-location computing device 1042 is configured for data communications with the e-commerce system 1004 and for short-range communications with one or more of the user devices 1002 at the location. The short-range communications may be, for example, NFC, WiFi Direct™, Bluetooth™, etc. In some cases, the short-range communications may be one-way user device to computing device communications, such as through display of machine-readable elements on the user device 1002 and scanning or imaging of those elements by the on-location computing device 1042. In such implementations, the short-range communication module in the on-location computing device 1042 may include an imaging device, such as a camera.

The access controller 1024 may be configured to obtain a wallet address and a digital signature from one of the user devices 1002, and to validate that the digital signature confirms ownership of a public key corresponding to the wallet address. It may further be configured to store the wallet address, digital signature, and/or message signed by the digital signature in association with an identifier, as indicated by reference 1040. In some cases, the wallet address and identifier 1040 are stored in association with additional data regarding the user and/or the user device 1002, such as user account number with the e-commerce system 1004, a user identifier (e.g. name, phone number, email address, or other identifier), user device identifier, etc.

The e-commerce system 1004 may further include a blockchain network API 1028 configured to obtain blockchain data from the blockchain network, such as ownership data regarding a particular wallet address. The blockchain network API 1028 may be configured to query a blockchain node within the blockchain network. In some implementations, the e-commerce system 1004 itself operates a blockchain node. The blockchain network API 1028 may receive a request for token information from the access controller 1024, which may provide one or more wallet addresses. The blockchain network API 1028 may then query the blockchain network for token ownership information with respect to the wallet addresses and may receive data specifying the tokens owned by each of the respective wallet addresses according to the blockchain. The blockchain network API 1028 may then pass that token ownership information to the access controller 1024 to enable it to determine whether one or more of the wallet addresses satisfy the access condition(s) of a particular access control rule 1026.

The condition in an access control rule 1026 may include ownership of an NFT meeting specified token criteria. Accordingly, the e-commerce system 1004 may obtain (or may have previously obtained) wallet data from the user device 1002 and may query the blockchain network 1030 to validate that the user device 1002 is associated with an NFT as owner according to the blockchain and that the NFT has the requisite certain attributes.

In the examples described herein, the user device 1002 provides the e-commerce system 1004 and, in particular, the access controller 1024 with a wallet address and a digital signature via the network 1006. The user device 1002 may establish a user session with the e-commerce system 1004 over the network 1006 and may use Wallet Connect or similar protocols. The access controller 1024 authenticates the digital signature to verify that the user device 1002 holds the private key corresponding to a public key linked to the wallet address. Once authenticated, the e-commerce system 1004 stores the pre-authenticated wallet address and an identifier. The identifier may be any nonce or other unique code known to both the e-commerce system 1004 and the user device 1002. In one example, the identifier may be a session token. In another example the identifier may be generated by the user device 1002 and the e-commerce system 1004 using a hash of a session token and user data such as an account number or user identifier or the like. Other mechanisms may be used to generate a unique identifier that may then be stored at both the user device 1002 and the e-commerce system 1004.

At a later time, the user device 1002 is present at the same location as the on-location computing device 1042. The user device 1002 generates and outputs identification data based on the identifier stored within the user device 1002. The identification data may include a hash of the identifier. In some implementations, the identification data may include a time-variant element to ensure the hash is a time-sensitive one-time hash of the identifier. The data output by the user device 1002 may include other identifying data, such as the wallet address, a user identifier, a device identifier, an account identifier, or another such data element. The output data may be encoded in a machine readable code displayed on the screen of the user device 1002, such as a QR code, bar code, or the like.

The on-location computing device 1042 receives the data output by the user device 1002, for example through image capture of the QR code or over a short-range NFC connection or some other short-range communication channel. The on-location computing device 1042 (or the e-commerce system 1004 in some implementations) validates that the identification data corresponds to an identifier stored in association with a pre-authenticated wallet address. If the identification data corresponds to an identifier stored with a pre-authenticated wallet address, then the on-location computing device 1042 (or the e-commerce system 1004) verifies using blockchain network data that the wallet address holds the one or more NFT(s) specified by an applicable one of the access control rules 1026.

In some implementations, the on-location computing device 1042 may include audio and/or visual output devices to signal whether the access control rule has been satisfied or not. An audible tone and/or lights/images may indicate success (access granted) or failure (access denied).

Figure 2:
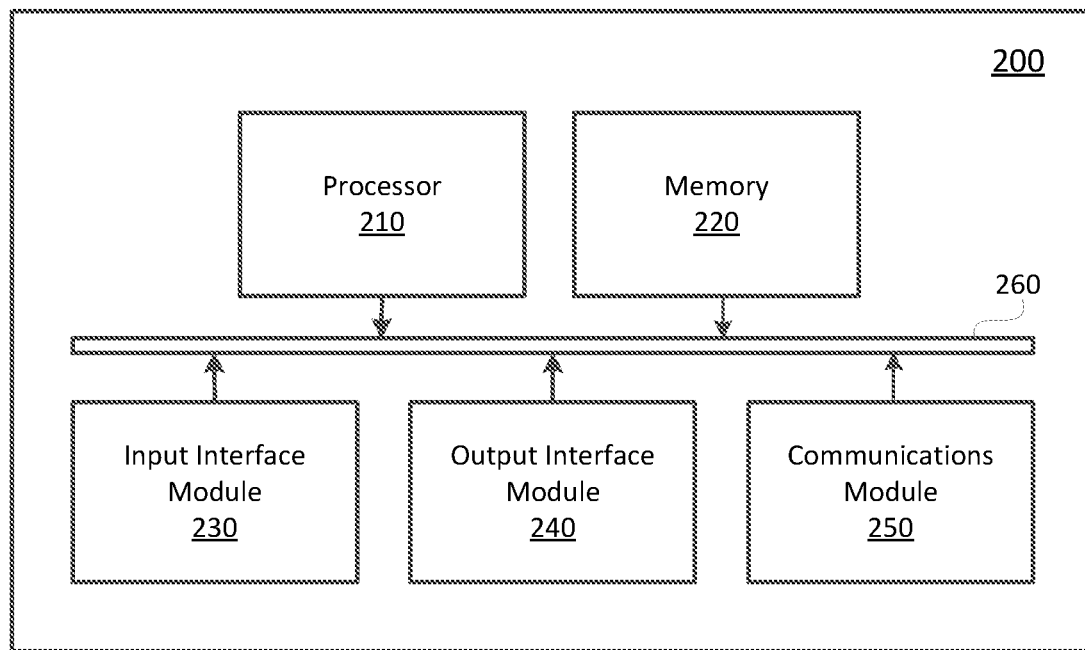
FIG. 2 is a high-level schematic diagram of a computing device.

The e-commerce system 1004, the on-location computing device 1042, and/or the user devices 1002 may be implemented using one or more computing devices. FIG. 2 is a high-level diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi (™), via the Ethernet family of network protocols, using Bluetooth (™) or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software instructions are executed by the processor 210 from a computer-readable medium. For example, software may be loaded into random-access memory from persistent storage within memory 220. Additionally, or alternatively, instructions may be executed by the processor 210 directly from read-only memory of the memory 220.

Figure 3:
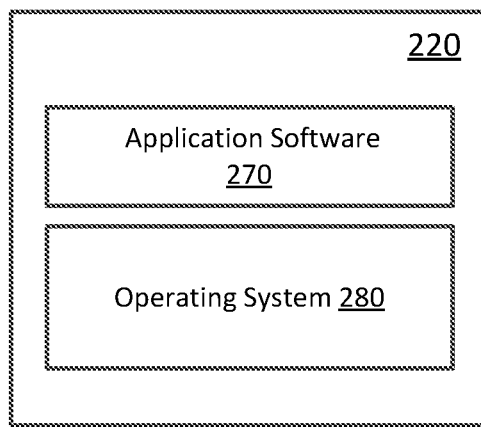
FIG. 3 shows a simplified organization of software components stored in a memory of the computing device of FIG. 2.

FIG. 3 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 3, in operation, the memory 220 may include more than one application software and different application software may perform different operations. Example application software 270 includes the wallet application 1032 (FIG. 1), the web browser 1020 (FIG. 1), or the mobile application 1022 (FIG. 1).

The operating system 280 is software. The operating system 280 allows the application software 270 to access the processor 210, the memory 220, the input interface module 230, the output interface module 240 and the communications module 250. The operating system 280 may, for example, be iOS™, Android™, Linux, Microsoft Windows™, or the like.

Figure 4:
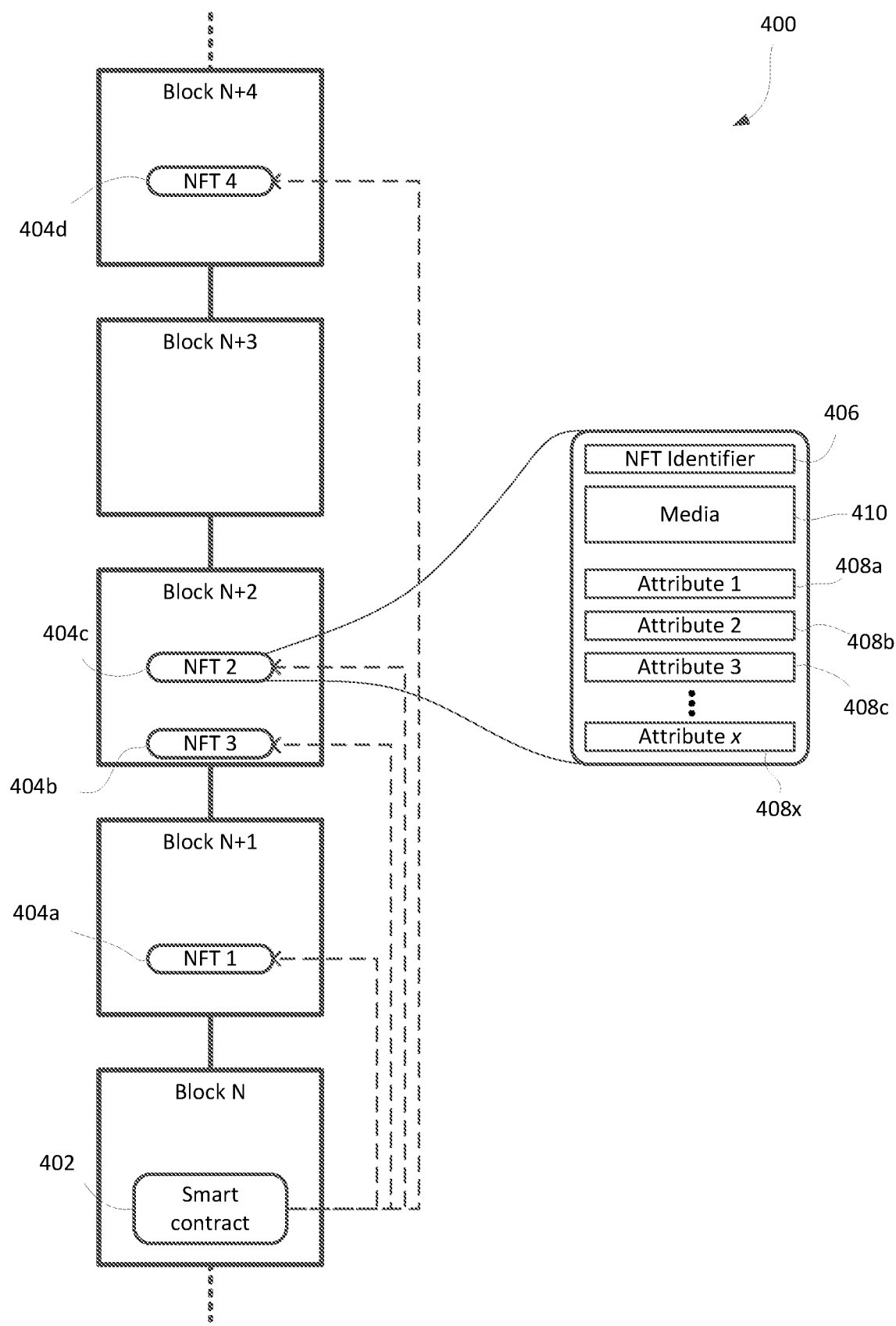
FIG. 4 graphically illustrates an example segment of a blockchain recording non-fungible tokens.

Reference is now made to FIG. 4, which illustrates an example blockchain 400. The blockchain 400 is a record of validated transactions grouped into blocks and successfully "mined" by one of the mining nodes within a blockchain network. Each block is immutable and is linked to the previous block by way of incorporating a hash of the previous block header within its own header. The functioning of a blockchain network and the variations possible under different blockchain protocols will be appreciated by those ordinarily skilled in the art.

A smart contract 402 may be implemented within the blockchain 400. In some cases, like with the Ethereum blockchain, the smart contract 402 may be executable code recorded on chain and may include functions that are available for execution by having those functions called in subsequent transactions. In this example, the smart contract 402 relates to NFT generation and/or management. That is, the smart contract 402 may have functions for minting NFTs, determining/validating ownership of those NFTs, transferring ownership of those NFTs from a current valid owner to a new owner. It will be appreciated that "ownership" is generally associated with an address, e.g. a public key value which may sometimes be referred to as a wallet identifier or wallet address. A computing device that holds the corresponding private key may be used to authenticate the computing device as the owner of that public key, thereby enabling the computing device to take actions with respect to the "owned" NFT, such as transferring it to a different wallet address.

When the smart contract 402 is used to mint NFTs, the minting and ownership data for that NFT may be recorded on the blockchain 400, as indicated by 404a, 404b, 404c, 404d (collectively, 404). In some cases, the NFT data recorded on-chain includes, for example, a unique NFT identifier 406. In some instances, the NFT data recorded on-chain may include one or more media files 410 or URI link(s) to one or more media files that are the subject of the NFT. The media files 410 may include, for example, an image file, a video file, an audio file, or combinations thereof.

The NFT data may further include one or more NFT attributes 408 (shown as 408a, 408b, 408c, . . . , 408x). The NFT attributes 408 may include contextual information regarding the NFT, such as a minting date, a category, data regarding the features or characteristics of the media file 410, or any other such attributes of the subject matter of the NFT. The NFT attributes 408 may be in the form of a list of name-value pairs, a hierarchical tree of name-value pairs, a nested structure of attributes, a linked list, an array, or in any other suitable data structure format.

The NFTs 404 minted and managed by the smart contract 402 may be considered part of a collection of NFTs in that they are all governed by the same smart contract 402. In some cases, a collection of NFTs may be minted using different smart contracts or using non-blockchain code for generation of the NFTs and off-chain software for causing recordal of the NFTs on chain in blockchain transactions. Such NFTs may nevertheless be considered part of a single collection of NFTs if they are linked in such a manner as to form a collection, such as having a link or reference within each NFT identifying those NFTs as belonging to a specific collection. In one example, an NFT collection may have a single NFT.

Figure 5:
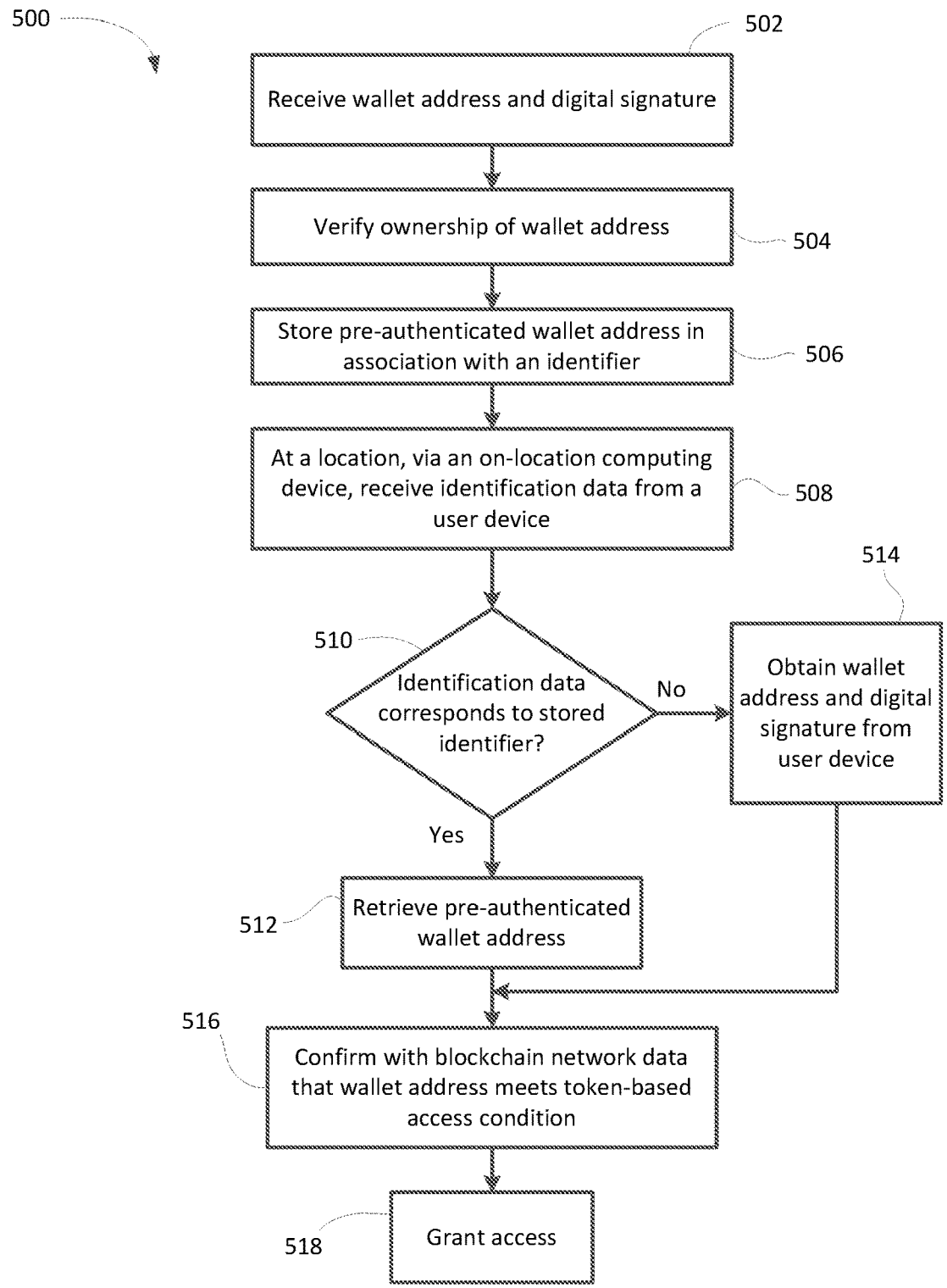
FIG. 5 shows, in flowchart form, one example method of token-based access control.

Reference will now be made to FIG. 5, which shows, in flowchart form, one example method 500 for on-location token-based access control. The method 500 may be implemented by a computing platform, such as an e-commerce platform in some cases. In particular, the method 500 may be implemented by way of suitably-programmed software instructions stored in memory on a computing device which, when executed by one or more processors of the computing device, cause the computing device to carry out the described operations. In some cases, the method 500 may be implemented by one or more computing systems forming an e-commerce platform or system, such as the e-commerce system 1004 (FIG. 1) and/or the on-location computing device 1042 (FIG. 1). Although the following method 500 is described in the context of an e-commerce implementation, it will be appreciated that the operations of the method 500 may be generalized to apply in applications and contexts other than e-commerce.

The method 500 may be initiated during a session between a user device and a computing system, such as an e-commerce platform. In operation 502, the computing system obtains a wallet address and a digital signature from the user device. The wallet address and digital signature may be received in reply to a challenge message sent by the computing system in some cases. The digital signature may result from the user device digitally signing the challenge message using a private key securely stored on the user device and corresponding to the public key associated with the wallet address.

In operation 504, the computing system confirms the digital signature (a valid digital signature evidencing possession by the user device of the private key), thereby authenticating the wallet address provided by the user device. In some cases, the wallet address itself is the public key. In some other cases, the wallet address is linked to the public key. Some signature schemes, such as the elliptic curve digital signature algorithm (ECDSA) commonly used in some blockchain protocols, enable recovery of the public key from the message and the digital signature of the message. Once authenticated, the computing system has confirmation that the user device holds the private key that corresponds to the wallet address, thus confirming that the user of the user device owns the wallet address.

The computing system then stores the authenticated wallet address in association with an identifier in operation 506. The identifier is any unique data known to both the user device and the computing system. The identifier, or a seed value for generating the identifier, may have been passed from the user device to the computing system, or from the computing system to the user device. In some cases, the identifier is a session token or other data unique to the session between the user device and the computing system. The authenticated wallet address and identifier may be stored by the computing system in association with other data that points to the user or user device, such as a name, account number, contact information, device identifier, or the like. In some implementations the storage of the wallet address and identifier is in a table or database indexed by the other data, such as by user account number or user identifier.

Later, after termination of the session between the user device and the computing system, the user attends a location at which access control is implemented in association with the computing system. In one example, the access control may relate to a venue or event to which access is restricted based on an access control rule. In another example, the access control may relate to a product item available for sale or for free to persons that pass an access control rule. In a further example, the access control may relate to a discount or other incentive available to persons at a retail location that pass an access control rule. The access control rule is a token-based access control rule where ownership of one or more NFTs or NFTs having certain attributes is the condition for passing the access control rule.

The location includes an on-location computing device coupled to the computing system. The on-location computing device is configured to receive data from user devices at short range, such as through scanning QR codes, NFC, or other such short-range communication mechanisms.

In order to gain access to the restricted event or item, the user of the user device causes the user device to output identification data. The identification data may be generated based on the identifier. In one example, the identification data may be the identifier. In some cases, the identification data may be encoded, such as within a QR code or the like. In some cases, the identification data may be a hash or other encoding of the identifier. In some cases, the identification data may be a time-limited hash, such as a hash of the identifier and a time-based element or nonce. The output data may include the identification data generated based on the identifier and another piece of identifying data, such as a username, account number, device identifier, wallet address, or other data.

In operation 508, the on-location computing device obtains the identification data and the other piece of identifying data from the user device. It may do so through scanning and decoding a QR code in some cases, or through receiving and decoding an NFC communication, or through some other short-range communication channel. The other piece of identifying data may be used by the on-location computing device or the computing system to locate the corresponding wallet address and identifier in memory. In operation 510, the on-location computing device or the computing system determines whether the identification data received from the user device corresponds to the stored identifier. For example, the computing system may independently hash the stored identifier and time element so as to generate a hash result that can be compared to the identification data received from the user device. If the identification data is confirmed as being generated from the identifier, then the computing system has confirmed that the user device is in possession of the identifier and, as such, is linked to the pre-authenticated wallet address. Accordingly, the computing system retrieves the pre-authenticated wallet address, as indicated by operation 512.

If identification data is not received in operation 508 or is not validated as being generated based on a recognised identifier in operation 510, then in operation 514, the on-location computing device may initiate a wallet connect operation with the user device in order to obtain and verify wallet address information from the user device using a process similar to that described above in connection with operations 502 and 504. However, it may be appreciated that this may require two-way communications between the on-location computing device and the user device and may introduce delay in the throughput of access control at the location. In some cases, the on-location computing device may output a failure notification, such as an audible tone or visual display, and the method 500 may end.

If the authenticated wallet address has been retrieved in operation 512 (or a newly-authenticated wallet address is obtain as a result of operation 514), then in operation 516 the on-location computing device and/or computing system determine from blockchain data and an access control rule whether the wallet address meets the access condition. The condition may be that the wallet address hold one or more particular NFTs or NFTs having specified attributes. In one example, the condition may be that the wallet address holds an NFT that represents a ticket to access an event or venue. In another example, the condition may be that the wallet address hold one or more NFTs representing coupons, membership, or other such indicia of entitlement to a discount or free item. In some cases, the condition may be that the wallet hold an NFT from a certain collection of NFTs that has one or more particular attributes.

The blockchain data may be blockchain data read directly from the blockchain network, e.g. by searching the blockchain for data regarding the wallet address and virtual assets transferred to the wallet address. In some cases, the computing system may query a blockchain indexing service based on the wallet address and may receive in reply details of the wallet address holdings. Such a service may monitor the blockchain and maintain a searchable database of wallet address holdings. In some cases, to speed on-location access control operations, the computing system may provide the on-location computing device with a database of wallet address holdings detailing NFTs held by wallet addresses on the blockchain. That static blockchain data may be periodically downloaded/updated by the computing system so as to ensure the on-location computing device has a near real-time state of the blockchain available, but does not need to wait for the delay inherent in sending queries regarding a wallet address to a remote server or service and awaiting a response.

If the computing system or on-location computing device determines that the authenticated wallet address holds the requisite NFT(s) specified by the access condition, then in operation 518 the on-location computing device grants access. Granting access may include outputting a success notification, such as an audible signal, visual signal, vibratory signal, etc., indicating that access is granted. In the case of an automated turnstile, this may include a visual signal (e.g. green light), an audible signal (e.g. upbeat chime), and/or a mechanical signal (e.g. unlocking of a physical gate).

Figure 6:
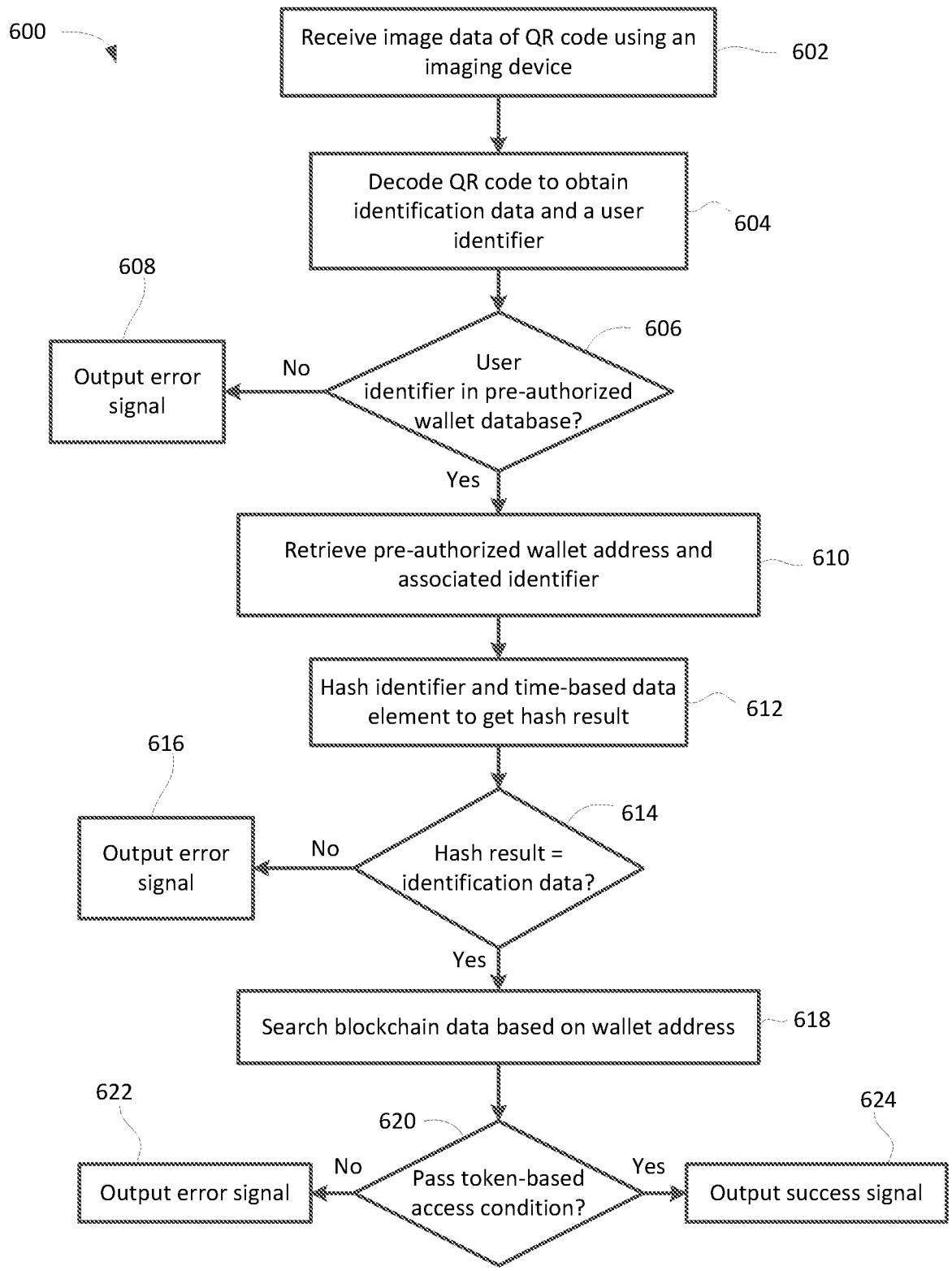
FIG. 6 shows, in flowchart form, another example method of token-based access control.

Reference is now made to FIG. 6, which shows, in flowchart form, one example method 600 of in-person token-based gating. The method 600 may be implemented by a computing system, such as the e-commerce system 1004 (FIG. 1), including an on-location computing device configured to receive data from a user device over short range. The data may be received through inductive communication, electromagnetic communication, or optical scanning, as examples. In this particular example, the user device is configured to display a QR code or other machine-readable image encoding data, and the on-location computing device includes an image sensor and software operable to detect the QR code or other machine-readable code and to decode the encoded data from the image. The operations below may be described as being performed by the on-location computing device; however, it will be appreciated that some of the described operations may be performed by a computing system to which the computing device is coupled and with which it may exchange data. The computing system may be at the location or may be remote from the location of the computing device. Communication between the computing device and the computing system may be by way of secure network connection.

In operation 602 the computing device receives image data, including the QR code, using an imaging sensor such as a camera. The computing device may be stationary and the user device may be placed such that its screen displaying the QR code is in the field of view of the camera, or the computing device may be mobile (such as a smartphone or tablet) and an operator may position the computing device so as to scan the QR code on the user device's display screen using the image sensor.

The computing device decodes the QR code to obtain identification data and a user identifier in operation 604. The identification data is data that was generated by the user device based on an identifier associated with the pre-authentication of its blockchain wallet address by the computing system. The user identifier is other data that is uniquely associated with the user and/or the user device, such as a name, account number with the computing system, device identification number, mobile subscriber number, wallet address, etc.

As described earlier, when the computing system pre-authenticates a wallet address for a user based on verification of a digital signature provided, it stores the pre-authenticated wallet address together with a unique identifier. The identifier may be a token or other string of data in the possession of both the computing system and the user device seeking pre-authentication. In some examples, the identifier may be the session token for the session during which pre-authentication occurs or a hash of the session token. When the computing system stores the pre-authenticated wallet address in association with the identifier, it may further store that data in association with a user identifier. The user identifier may be the user name, account number, device identification number, etc.

Based on the user identifier received from the user device, the computing device searches for a matching user identifier in the record or database of pre-authenticated wallet addresses in operation 606. If it does not find a pre-authenticated wallet address record that corresponds to the user identifier provided, then it may determine that the user device does not have a pre-authenticated wallet address and may output an error signal in operation 608. The error signal may be an audible, visual, and/or kinetic output to notify the operator of the computing device and/or the user of the user device that the pre-authenticated wallet address was not found. In some cases, the user device and/or the computing device may signal that a wallet authentication operation should be initiated on the user device (not shown).

If, in operation 606, a record of a pre-authenticated wallet address is found that corresponds to the user identifier received, then in operation 610 the computing device retrieves the pre-authenticated wallet address and the associated identifier from memory. It then hashes the retrieved identifier in operation 612. In this example, it hashes the retrieved identifier together with a time-based data element. A hashing algorithm specifies how the time-based data element is determined and is implemented in both the user device and the computing device so as to ensure both use the same time-based data element. The input of the retrieved identifier and the time-based data element into the hash function produces a hash result. In operation 614, the computing device then compares that hash result to the identification data decoded from the QR code displayed by the user device. If they do not match, then the computing device may output an error signal in operation 616.

If the hash result and the identification data obtained from the user device match, then the computing device has determined that the user device is in possession of the same identifier as the one stored in association with the pre-authenticated wallet address. On this basis, the user device showing the QR code is authenticated as being associated with the pre-authenticated wallet address. Accordingly, the computing device may then search blockchain data based on the wallet address to determine whether it holds the requisite token(s) for gaining access. In operation 618, the computing device sends a query for data identifying tokens held by the wallet address. In some cases, the query may be sent to a blockchain indexing node configured to monitor the state of the blockchain and to maintain an indexed database of wallet address holdings. Other mechanisms may be used to determine the tokens held by the wallet address based on blockchain data.

When a response is received to the query, the computing device determines, based on the access condition set by the access control rule, whether the wallet address holds the required token or tokens, or a token having the required attributes, as indicated by operation 620. If the condition is not satisfied because the wallet address does not have the required token(s), then an error signal may be output in operation 622. If the condition is satisfied, then a success signal may be output in operation 624. The success signal may be an audible output, a visual output, a kinetic output, and/or a mechanical operation in various implementations.

In any of the above-described example methods or processes it will be understood that certain operations described as occurring in sequence may be implemented in a different sequence or carried out in parallel without impacting the overall functioning of the method or process.

Example E-commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
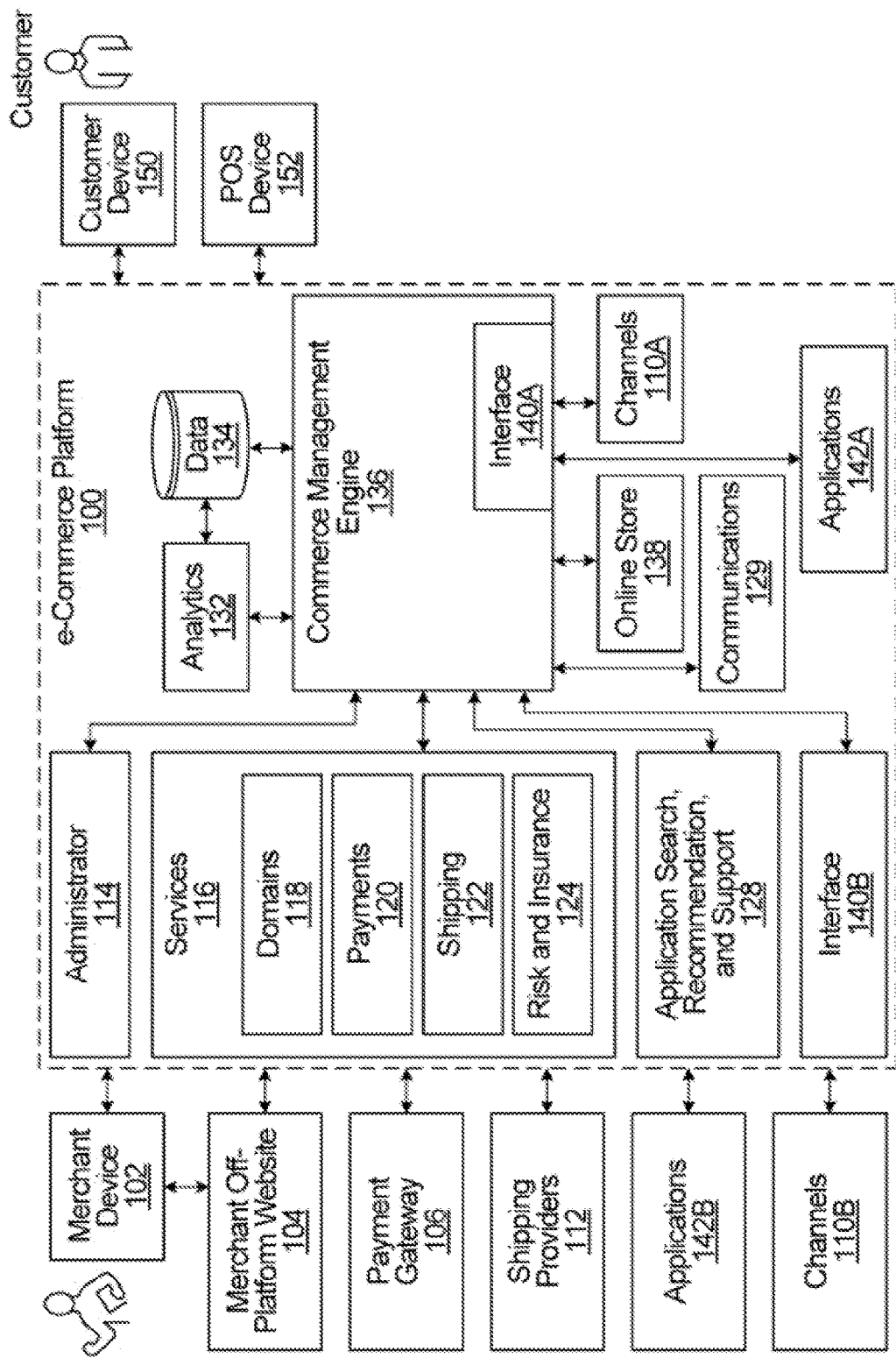
FIG. 7 is a block diagram of an e-commerce platform, in accordance with an example embodiment.

FIG. 7 illustrates an example e-commerce platform 100, according to one embodiment. The e-commerce platform 100 may be exemplary of the e-commerce system 1004 described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancellation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
during a pre-authentication stage during a session with a user device,
receiving, from the user device, at a computing system, a digital signature and a wallet address;
validating the digital signature to authenticate the wallet address and, based on validation, storing, at the computing system, the wallet address in association with an identifier, wherein the identifier is also stored on the user device;
after the session terminates and during an on-location access stage,
receiving, at an on-location computing device coupled to the computing system, from the user device, over short-range, an access request including identification data, the identification data purporting to be based on the identifier, wherein the identification data is generated by the user device using the identifier and a nonce;
confirming that the identification data is based on the identifier by independently generating the nonce,
hashing the nonce together with the identifier stored in association with the wallet address to obtain a hash result, and
confirming that the hash result matches the identification data received;
responsive to confirming that the identification data is based on the identifier, retrieving the wallet address associated with the identifier;
determining, based on blockchain data from a blockchain network, that the wallet address is associated with one or more tokens and that the one or more tokens satisfy an access condition associated with the access request; and
responsive to determining that the wallet address is associated with the one or more tokens and that the one or more tokens satisfy the access condition associated with the access request, performing an action.

2. The method of claim 1, wherein the access request is received from the user device via a short-range communication module in the on-location computing device coupled to the computing system.

3. The method of claim 2, wherein performing an action includes outputting a success signal at the on-location computing device coupled to the computing system.

4. The method of claim 3, wherein outputting includes outputting an audio-visual signal on the on-location computing device.

5. The method of claim 1, wherein the on-location computing device includes a scanning device and wherein the identification data includes a hash of the identifier.

6. The method of claim 5, wherein the scanning device includes an optical scanning device configured to obtain a QR code displayed on the user device, wherein the QR code encodes the identification data.

7. The method of claim 1, wherein the nonce is time-based.

8. The method of claim 1, wherein storing includes storing the wallet address and the identifier in association with a user identifier, wherein receiving the access request further includes receiving the user identifier, and wherein confirming further includes retrieving the identifier from memory based on the user identifier.

9. The method of claim 8, wherein the user identifier includes a device identifier or a user account identifier for a user account on the computing system.

10. The method of claim 9, wherein the computing system is an e-commerce system, the user identifier is the user account identifier for the user account on the e-commerce system, and wherein the user account identifier is associated with an e-commerce application on the user device.

11. The method of claim 1, wherein the on-location computing device includes an image sensor and receiving includes detecting a machine-readable code displayed on a display screen of the user device.

12. The method of claim 11, wherein the on-location computing device is one of an automated turnstile, a hand-held scanning device, a smartphone, a tablet, or a point-of-sale device.

13. The method of claim 1, wherein the access request includes a request to obtain a limited access item or a request to enter a limited access event.

14. A computing system, comprising:
one or more processing units;
one or more data storage units; and
memory storing processor-executable instructions that, when executed by the one or more processing units, are to cause the processing units to:
during a pre-authentication stage during a session with a user device,
receive, from the user device, at the computing system, a digital signature and a wallet address;
validate the digital signature to authenticate the wallet address and, based on validation, store the wallet address in association with an identifier, wherein the identifier is also stored on the user device;
after the session terminates and during an on-location access stage,
receive, at an on-location computing device coupled to the computing system, from the user device, over short-range, an access request including identification data, the identification data purporting to be based on the identifier, wherein the identification data is generated by the user device using the identifier and a nonce;
confirm that the identification data is based on the identifier by independently generating the nonce, hashing the nonce together with the identifier stored in association with the wallet address to obtain a hash result, and
confirming that the hash result matches the identification data received;
responsive to confirming that the identification data is based on the identifier, retrieve the wallet address associated with the identifier;
determine, based on blockchain data from a blockchain network, that the wallet address is associated with one or more tokens and that the one or more tokens satisfy an access condition associated with the access request; and
responsive to determining that the wallet address is associated with the one or more tokens and that the one or more tokens satisfy the access condition associated with the access request, perform an action.

15. The computing system of claim 14, wherein the access request is received from the user device via a short-range communication module in the on-location computing device coupled to the computing system.

16. The computing system of claim 14, wherein the on-location computing device includes an image sensor, and wherein the instructions, when executed, are to cause the one or more processing units to receive the access request by detecting a machine-readable code displayed on a display screen of the user device.

17. The computing system of claim 14, wherein the instructions, when executed, are to cause the one or more processing units to store the wallet address and the identifier in association with a user identifier, and wherein the instructions, when executed, are to cause the one or more processing units to receive the access request by further receiving the user identifier and to retrieve the identifier from memory based on the user identifier.

18. A non-transitory computer-readable media storing processor-executable instructions, wherein the instructions, when executed, are to cause one or more processing units to:
during a pre-authentication stage during a session with a user device,
receive, from the user device, at a computing system, a digital signature and a wallet address;
validate the digital signature to authenticate the wallet address and, based on validation, store the wallet address in association with an identifier, wherein the identifier is also stored on the user device;
after the session terminates and during an on-location access stage,
receive, at an on-location computing device coupled to the computing system, from the user device, over short-range, an access request including identification data, the identification data purporting to be based on the identifier, wherein the identification data is generated by the user device using the identifier and a nonce;
confirm that the identification data is based on the identifier by independently generating the nonce, hashing the nonce together with the identifier stored in association with the wallet address to obtain a hash result, and
confirming that the hash result matches the identification data received;
responsive to confirming that the identification data is based on the identifier, retrieve the wallet address associated with the identifier;
determine, based on blockchain data from a blockchain network, that the wallet address is associated with one or more tokens and that the one or more tokens satisfy an access condition associated with the access request; and
responsive to determining that the wallet address is associated with the one or more tokens and that the one or more tokens satisfy the access condition associated with the access request, perform an action.

19. The method claimed in claim 1, wherein the nonce includes a time step.

20. The method claimed in claim 19, wherein the time step is valid for a window of time.

* * * * *